United States Patent [19]
Blahous et al.

[11] Patent Number: 4,710,735
[45] Date of Patent: Dec. 1, 1987

[54] ABSORPTION CIRCUIT

[75] Inventors: Leopold Blahous, Wettingen; Gerhard Linhofer, Baden, both of Switzerland

[73] Assignee: BBC Brown, Boveri & Company, Limited, Baden, Switzerland

[21] Appl. No.: 809,799

[22] Filed: Dec. 17, 1985

[30] Foreign Application Priority Data

Jan. 8, 1985 [CH] Switzerland ............... 59/85

[51] Int. Cl.$^4$ ................. H03H 7/01; H03H 7/06
[52] U.S. Cl. ............................. 333/175; 333/167; 333/176; 333/181; 361/113
[58] Field of Search ................. 333/167-170, 333/174-176, 181-185; 322/58, 75, 76, 77, 78; 363/39-40, 42, 44-48; 361/111, 113, 118, 119, 31, 33, 54, 56; 323/364, 365, 371, 204-206

[56] References Cited

U.S. PATENT DOCUMENTS

| | | | |
|---|---|---|---|
| 3,248,607 | 4/1966 | Lemens | 361/17 |
| 3,290,578 | 12/1966 | Ainsworth | 333/176 X |
| 3,555,291 | 1/1971 | Dewey | 333/176 X |
| 3,813,593 | 5/1974 | Tice et al. | 333/175 X |

FOREIGN PATENT DOCUMENTS 470781  5/1969  Switzerland .

OTHER PUBLICATIONS

Uhlmann—"Power Transmission by Direct Current", Springer-Verlag, Berlin, Heidelberg, New York, 1975, pp. 368-379.

Primary Examiner—Marvin L. Nussbaum
Attorney, Agent, or Firm—Burns, Doane, Swecker & Mathis

[57] ABSTRACT

Absorption circuits ($C_f, L_F$) are used for filtering out unwanted harmonic currents in electric lines (R, S, T), particularly for rated power within the range of 1 MVar-1 GVar, for example in the case of high-voltage direct-current transmission systems. So that the absorption circuit holds the virtual capacitance of the filter capacitor circuit ($C_f$) at its rated value at a tuned frequency even when one or more capacitors (C11, C21, C12, C22) fail, a compensating choke (L) is provided in the cross branch of an "H" circuit of the capacitors. The capacitance of each capacitor (C11 ... C22) is equal to the total capacitance C of the filter capacitor circuit ($C_f$). The inductance L of the compensating choke (L) is equal to $1/\omega^2 C$, where $\omega$=angular frequency of the harmonic. The compensating choke (L) can be designed for 5%-10% of the power of the filter choke ($L_F$). Instead of in the cross branch, the compensating choke can also be connected between two series-connected capacitors (C12, C22) in series with these capacitors.

4 Claims, 5 Drawing Figures

ABSORPTION CIRCUIT

BACKGROUND OF THE INVENTION

The invention relates to a absorption circuit for filtering out an harmonic current in electric lines.

STATE OF THE ART

During the operation of static converters, harmonic currents with frequencies which are an integral multiple of the fundamental frequency are produced in the feed lines on the alternating-current side of the static converter. This produces voltage distortions in the alternating-voltage system. Of particular significance in this are the so-called characteristic harmonics of low ordinal number, in which the harmonic currents can reach a considerable proportion of the current of the fundamental oscillation. For example, in a six-coil three-phase bridge circuit, the harmonics with ordinal numbers 5, 7, 11 and 13 are dominant and essentially determine the voltage distortion occurring.

To keep the harmonic currents away from the alternating-current system and thus to reduce the voltage distortion, absorption circuits, also called filters, are used in many cases. They are connected in parallel with the source of the harmonics in the alternating-current system. In its simplest type of embodiment, each absorption circuit consists of a series circuit of a capacitor and a choke. Tuned to a certain frequency (the frequency of a harmonic current occurring dominantly), each absorption circuit forms a very small impedance for this frequency, with the result that the corresponding harmonic current flows largely into the absorption circuit instead of into the system.

One is interested for cost reasons in keeping the reactive power at the fundamental oscillation, and thus the construction size of such a absorption circuit, as small as possible. A lower limit for the constructional power is given by the requirement, which is determining for the effectiveness of the absorption circuit, that a limit value of impedance is not exceeded, taking into consideration various tolerances and deviations from rated conditions.

In this context, the following factors must be taken into consideration:

Frequency changes in the three-phase system. In steady-state operation, frequency changes are very small, as a rule, less than 0.5% in by far the greatest number of cases.

Manufacturing tolerances of the components: capacitors and chokes. These are of the order of magnitude of 3%. These manufacturing tolerances can be largely corrected by constructional measures at the choke (taps or divided choke with variable distance between the two choke halves).

Temperature-dependent change of the capacitance of the capacitors. In the case of currently used capacitors with modern dielectrics, the change is approximately 2% at the usual operating temperatures, and a little more under extreme climatic conditions.

Failure of a capacitor unit. Capacitor banks of absorption circuits consist of individual capacitor units which are connected both in parallel and in series. The individual capacitors are protected by fuses. In the case of an internal fault in a capacitor unit, this unit is isolated from the rest of the capacitor bank by the fuse. This results in a change of the total capacitance of the capacitor bank. For reasons of plant availability, the requirement exists in most cases that, if a capacitor unit fails, the effectiveness of the absorption circuit is retained and no disconnection must take place. The absorption circuit may be taken out of operation only if several capacitor units fail. For this purpose, a protection and monitoring device is provided for the capacitor bank which device reports the failure of a capacitor unit and effects a disconnection if several units fail.

Single capacitors can be produced with maximum rated powers of 300 kVar–350 kVar. If absorption circuits are to be used which have the lowest possible installed fundamental reactive power, the necessity frequently exists for using capacitor units having smaller rated powers since otherwise the failure of one unit would lead to an inadmissible detuning of the absorption circuit. The use of capacitors having a small unit power prevents cost effective design of the capacitor banks.

The state of the art concerning capacitors as described in the book by Erich Uhlmann, Power Transmission by Direct Current, Springer-Verlag Berlin, Heidelberg, New York 1975, page 368–379 and particularly on page 378, FIG. 23.8. In this publication, an "H"-connected capacitor bank is used for the absorption circuit, which has r (for example 2×2) parallel-connected branches, s elements (for example 4 capacitors) being connected in series in each branch. Each of the r.s. elements is protected by a fuse. If these fuses isolate r parallel-connected elements, the remaining parallel-connected elements receive an increased voltage which must not exceed a predeterminable value of, for example, 125% of the rated voltage to prevent filter failure. The failure of one or several capacitor units causes a compensation current to flow in the cross link of the "H" circuit, which is sensed by means of one or more current transformers in the cross branch of the "H" circuit and is used for fault indication. If all four part-banks are of exactly the same size, no compensating current will flow.

OBJECTS AND SUMMARY OF THE INVENTION

An object of the present invention is to provide an absorption circuit for filtering out a harmonic current in electric lines, at the tuned frequency of which circuit the virtual capacitance of the filter capacitor circuit or of the capacitor bank retains its rated value even if its capacitance changes due to failure of individual capacitors in a part-bank.

An advantage of the invention consists in the fact that absorption circuits having very small fundemental reactive power can be produced in which the failure of at least one capacitor unit does not produce a change in the tuned frequency. If a capacitor unit fails, the absorption circuit does not need to be disconnected from the power system. The compensating choke provided in the filter capacitor unit can be designed for a relatively small power of 5%–10% of the power of the filter choke. The size of the capacitor bank of the filter capacitor unit and the number of individual capacitors required can be reduced. This results in a considerable saving of component costs, particularly in the case of absorption circuits which are used for rated powers within the range from 1 MVar–1 GVar, particularly in the case of high-voltage direct-current transmission systems.

BRIEF DESCRIPTION OF THE DRAWINGS

In the text which follows, the invention is explained with the aid of illustrative embodiments.

DETAILED DESCRIPTION OF THE PREFERRED EMBODIMENT

Figure 1:
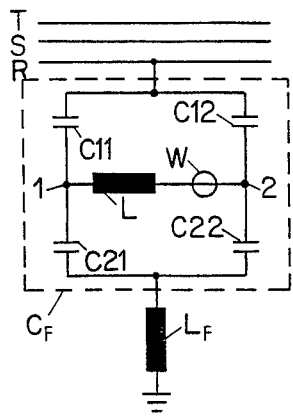
FIG. 1 shows a absorption circuit which is connected to one phase conductor of a three-phase system and which has a compensating choke in the cross link of an "H" circuit of the filter capacitor circuit.

In FIG. 1, R, S, T designate phase conductors or 20-kV busbars of a three-phase system. Each phase conductor can also be connected in familiar manner to further absorption circuits for the 7th, 11th, 13th and so forth harmonic oscillation. For the sake of simplicity, only one absorption circuit consisting of a series circuit of a filter capacitor circuit $C_F$ and a filter choke $L_F$ has been drawn in. The phase conductor R is earthed via this absorption circuit.

The filter capacitor circuit $C_F$ consists of an "H" circuit of capacitors comprising a first series circuit of capacitors or capacitor part-banks C11 and C21, a second series circuit of capacitors or capacitor part-banks C12 and C22, which are connected in parallel with the first series circuit of capacitors, and a cross branch consisting of a series circuit of a compensating choke L and a current transformer or current detector W. The capacitor part-banks comprise conventional combinations of capacitors and components such as fuses; in the following, the term "capacitors" should be understood to include capacitor part-banks as well as capacitors alone. This cross branch is connected, on the one hand, to a terminal or electric junction 1 of the two capacitors C11 and C21 and, on the other hand, to an electric junction 2 of the two capacitors C 12 and C 22. Each of the capacitors C11 ... C22 has a capacitance C of equal magnitude so that C11=C21=C12=C22=C applies, in which arrangement the designation of the capacitors is also used for designating their capacitance for the sake of simplicity. Thus, the total capacitance of the filter capacitor circuit $C_F$ also becomes C. The inductance, also designated by L for the sake of simplicity, of the compensating choke L is proportioned in such a manner that $L=1/(j\omega C)$, where $j=\sqrt{-1}$, $\omega = 5 \cdot 2\pi \cdot f_o$ = angular frequency of the 5th harmonic, $f_o = 50$ Hz = fundamental frequency of the three-phase current.

Figure 5:
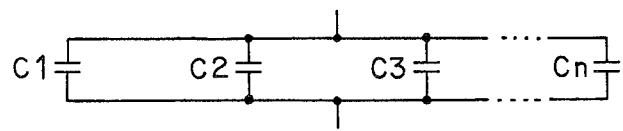

The failure of one or more capacitor units C11 ... C22 causes a compensating current to flow in the cross link of the "H" circuit which is sensed by the current transformer W installed at that point. If all four capacitor units C11 ... C22 are in order, no compensating current flows. With the correct proportioning, the insertion of the compensating choke L into the "H" circuit has the effect that at the tuning frequency of the absorption circuit, the virtual capacitance of the capacitor bank retains its rated value even when its capacitance changes due to failure of individual capacitors of a part-bank. Each capacitor or each part-bank C11 ... C22 consists of several single capacitors C1, C2, C3 ... Cn which are connected in parallel with each other (see FIG. 5).

Figure 2:
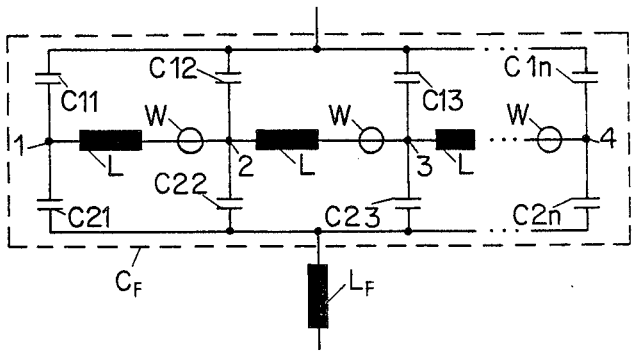
FIG. 2 shows a absorption circuit according to FIG. 1, comprising n parallel-connected series circuits of capacitors in the filter capacitor circuit.

In the absorption circuit shown in FIG. 2, the filter capacitor circuit $C_F$ has n parallel-connected series circuits of capacitors comprising in each case 2 series-connected capacitors C11 and C22, C12 and C22, C13 and C23 ... C1n and C2n where n is a positive whole number. Between each two electric junctions 1 ... 4 of two series-connected capacitors C11 and C21 ... C1n and C2n, a compensating choke L is connected in series with a current transformer W.

Figure 3:
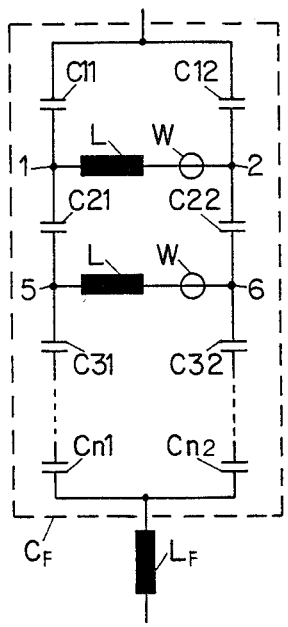
FIG. 3 shows a absorption circuit according to FIG. 1, comprising n capacitors for each series circuit of capacitors of the filter capacitor circuit.

In the embodiment of a absorption circuit shown in FIG. 3, the filter capacitor circuit $C_F$ comprises two parallel-connected series circuits of capacitors comprising in each case n series-connected capacitors C11, C21, C31 ... Cn1 and C12, C22, C32 ... Cn2. Each two electric junctions 1 and 2, 5 and 6 and so forth which correspond to each other with respect to voltage, of the capacitors C11, C21 and C12, C22 and C21, C31 and C22, C32 and so forth are electrically connected to each other via one compensating choke L each in series with a current transformer W.

For a certain frequency $\omega$, the total impedance Z of the circuit, neglecting the losses is:

$$Z = \frac{1}{j\omega} \cdot \frac{C11 + C12 + C21 + C22 - \omega^2 L \cdot (C12 + C22) \cdot (C11 + C21)}{(C11 + C12) \cdot (C21 + C22) - \omega^2 L \cdot [C11 \cdot C12 \cdot (C21 + C22) + C21 \cdot C22 \cdot (C11 + C12)]}$$

For C11=C12=C21=C22=C:

$$Z = \frac{1}{j\omega c}$$

is again obtained, independently of the magnitude of L.

The inductance L can then be selected in accordance with two criteria to make the total capacitance insensitive to the loss of single capacitors.

(a) In the case where C11=C12=C21=C22=C, $$L = \frac{1}{\omega^2 C} \qquad (3)$$

If then the capacitance in a part-bank changes and, for example, C11≠C12=C21=C22=C, the virtual capacitance of the total capacitor bank $C_g$ remains unchanged at a tuning frequency:

$$C_g = \frac{2 \cdot C \cdot C11 + 2 \cdot C^2 - (\omega^2/\omega^2 \cdot C) \cdot (2 \cdot C \cdot C11^2 + C11 \cdot C^2 + C^3)}{C11 + 3 \cdot C - (\omega^2/\omega^2 \cdot C) \cdot 2 \cdot C \cdot C11 - (\omega^2/\omega^2 \cdot C) \cdot 2 \cdot C^2}$$

The same result is obtained for $C12 \neq C11 = C21 = C22 = C$, $C21 \neq C11 = C12 = C22 = C$ and $C22 \neq C11 = C12 = C21 = C$. At the same time, the capacitance of the disturbed part-bank can vary from zero (entire part-bank disconnected) to infinity (part-bank short-circuited) without any change in the result of the equation (4). The only prerequisite is that there are no simultaneous capacitance changes in the other part-banks.

It can also be seen that the compensating choke L to be connected into the cross line has the same inductance as the main choke or the filter choke $L_F$ of a absorption circuit. But since the compensating current flowing in the cross link is much smaller as a rule, than the total current in the absorption circuit, this additional choke can be designed for a fraction of the design power of the main choke $L_F$.

(b) If the entire capacitor bank is to be made tolerant against simultaneous changes in all part-banks, the components of the absorption circuit can be designed in accordance with the following conditions:

$$Z(C11, C12, C21, C22, t, \omega) = \frac{1}{j\omega C} \quad (5)$$

$\partial Z/\partial C11=0$,
$\partial Z/\partial C12=0$,
$\partial Z/\partial C21=0$,
$\partial Z/\partial C22=0$.

A change in the capacitance in each of the four part-banks C11, C12, C21 and C22 by an amount $\Delta$C11, $\Delta$C12, $\Delta$C21 and $\Delta$C22, which is in each case different but small, results in a new total impedance of $Z(C11 + \Delta C11, C12 + \Delta C12, C21 + \Delta C21, C22 + \Delta C22, L, \omega) =$ $Z(C11,C12,C21,C22, L, \omega) + (\partial Z/\partial C11) \cdot \Delta C11 +$ $(\partial Z/\partial C12) \cdot \Delta C12 + (\partial Z/\partial C21) \cdot \Delta C21 + (\partial Z/\partial C22) \cdot \Delta C22 =$ $Z(C11,C12,C21,C22, L, \omega) = 1/(j\omega C),$ since the sections $\partial Z/\partial Ci$ disappear for the values determined in accordance with equation (5).

Naturally, a capacitor bank designed in accordance with equation (5) is insensitive only against changes which are small enough so that the approximation of the equation (6) correctly describes the change in total impedance.

Equation (5) represents a non-linear system of equations for the unknown quantities C11, C12, C21, C22 and L at the resonant frequency $\omega/2\pi$. The solution of such systems of equations can be determined, for example, in accordance with the Newton-Raphson method as described in the book by Joseph Stoer, Einführung in die numerische Mathematik I (Introduction to Numerical Mathematics I), Springer-Verlag, Berlin, Heidelberg, New York 1976, pages 217–221. Since equation (5) describes a general method for two-terminal networks with four capacitors in an "H" circuit with an inductance in the capacitor bank, the method is also applicable to variants comprising a compensating choke L in series with a part capacitance C12, C22 for example in accordance with FIG. 4.

Figure 4:
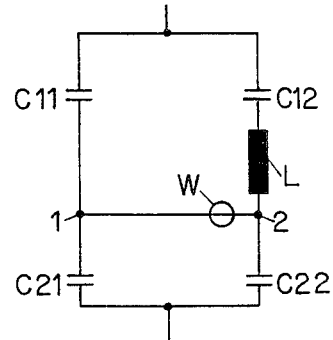
FIG. 4 shows a absorption circuit comprising a compensating choke of a series circuit of capacitors of the filter capacitor circuit and FIG. 5 shows a capacitor part-bank of the filter capacitor circuit according to FIGS. 1 to 4.

The filter capacitor circuit $C_F$ shown in FIG. 4 differs from that in FIG. 1 only by the different arrangement of the compensating choke L which, in this case, is connected in series with the capacitors C12 and C 22 between the electric junction 2 and the capacitor C12. As in the circuit according to FIG. 1, the current transformer W detects a compensating current occurring in the event of a capacitor failure.

The capacitors or part-banks C11 . . . Cnn of the circuits according to FIGS. 1–4 can in each case have single capacitors which are connected in parallel with each other, according to FIG. 5.

In the text which follows, a preferred illustrative embodiment of the absorption circuit shown in FIG. 1 is reproduced.

For reasons of clarity, the influence of the system reactance and the damping (losses) of the filter components have not been taken into consideration.

To each phase conductor R, S, T of a 20-kV busbar a absorption circuit is connected which is tuned to the fifth harmonic oscillation.

The requirement for the absorption circuit is that a harmonic current $I_5$ of 500 A should not cause a voltage distortion D of more than 1%.

The production tolerance of the absorption circuit choke is ±3%. The production tolerance of the absorption circuit capacitors and the temperature-related change of capacitance, together, produce a tolerance of ±5%. If a single capacitor fails, the absorption circuit effect should be maintained.

Initial data:

| | |
|---|---|
| U = 20 kV | Busbar voltage, |
| $I_5$ = 100 A | Harmonic current, |
| $f_o$ = 50 Hz | Fundamental frequency, |
| $\omega = 5 \cdot 50 \cdot 2\pi =$ | Angular frequency of the harmonic, |
| = 1570.8 s$^{-1}$ | |
| $f_5$ = 250 Hz | Tuned frequency of the series-tuned circuit |
| D $\leq$ 1% | Permissible voltage distortion. |

The maximum harmonic voltage $U_5$ is then:

$$U_5 = (20000/\sqrt{3}) \cdot D/100 = 115.5 \text{ V}.$$

For the maximum permissible absorption circuit impedance $Z_{max}$, the following is obtained:

$$Z_{max} = U_5/I_5 = 115.5/100 \Omega = 1.155 \Omega$$

The absorption circuit consists of four equally large "H"-connected part-banks according to FIG. 1, each part-bank consisting of n parallel-connected single capacitors C1 . . . Cn according to FIG. 5.

Let the capacitance of one part-bank be C. The capacitance of the total capacitor bank then also becomes = C.

The capacitance of a single capacitor is $C' = C1 = C2 = \ldots Cn = C/n$.

The following applies to the design for the tuned frequency:

$$Z_0 = j\omega L + \frac{1}{j\omega C} = 0 \text{ and } L = \frac{1}{\omega^2 C}$$

Since resistive components are not taken into account in the simplified calculation, "j" is hereafter omitted.

In the construction according to the invention of the capacitor bank having the additional compensation choke L in the cross branch, the failure of a single capacitor has no influence. The necessary size of the components is found from the initially mentioned production and temperature tolerances, in accordance with the following relations:

$$Z_{max} = |\omega(L-\Delta L) - 1/[\omega(C-\Delta C)]| = 1.155\Omega$$

$$L - \Delta L = 0.97 \cdot L,$$

$$C - \Delta C = 0.95 \cdot C,$$

$$L = 1/(\omega_2 C),$$

$$Z_{max} = 1/(0.95 \cdot \omega \cdot C) - 0.97/(\omega \cdot C),$$

$$\omega \cdot C \cdot Z_{max} = 1.053 - 0.97 = 0.0826,$$

$$C = 0.0826/(\omega \cdot Z_{max}) = 0.0826/(1570.8 \cdot 1.155) F = 45.5 \, \mu F,$$

$$L = 8.9 \text{ mH}.$$

The fundamental and harmonics loading of the capacitors can then be used for determining the constructional size and the number of individual capacitors. For the definitive design, for example, a capacitor type with 12 $\mu$F and 12.6/$\sqrt{3}$ kV rated voltage is selected from the catalogue of a manufacturer and 4 capacitors are connected in parallel for each part-bank With $C' = 12 \, \mu F$ and $n=4$, the following is obtained:

$$C = n \cdot C' = 48 \, \mu F \text{ and}$$

$$L = 1/(1570.8^2 \cdot 12 \cdot 10^{-6}) = 8.45 \text{ mH}.$$

If the compensating choke L were not present, the effect of a failure of a single capacitor would also have to be taken into consideration. If one capacitor fails, the total capacitance changes as follows:

$$C_g = \frac{(2 \cdot n \cdot C) \cdot ((2 \cdot n - 1)C)}{2 \cdot n \cdot C + (2 \cdot n - 1) \cdot C} = \frac{2 \cdot n \cdot (2 \cdot n - 1) \cdot C}{4 \cdot n - 1}$$

$$= n \cdot C \cdot (4 \cdot n - 2)/(4 \cdot n - 1) = C \cdot (4 \cdot n - 2)/(4 \cdot n - 1).$$

With $n \cdot C' = C$, this results in:

$$Z_{max} = \frac{1}{0.95 \cdot \omega \cdot C} \cdot \frac{4 \cdot n - 1}{4 \cdot n - 2} - \frac{0.97}{\omega \cdot C},$$

$$\omega \cdot C \cdot Z_{max} = \frac{4 \cdot n - 1 - 0.97 \cdot 0.95 \cdot (4n - 2)}{0.95 \cdot (4 \cdot n - 2)}$$

$$= \frac{4 \cdot n - 3.686 \cdot n + 0.843}{3.8 \cdot n - 1.9} = \frac{0.314 \cdot n + 0.9843}{3.8 \cdot n - 1.9}$$

$$C = \frac{0.314 \cdot n + 0.843}{3.8 \cdot n - 1.9} \cdot \frac{1}{1570.8 \cdot 1.155} F.$$

From the condition for the size of C, it can be seen that either the total capacitance must be selected to be very large or it is necessary to install a large number of small single capacitors, compare the table following:

| n | C/$\mu$F |
|---|---|
| 1 | 335.6 |
| 2 | 142.2 |
| 3 | 103.6 |
| 4 | 87.0 |
| 5 | 77.8 |
| 6 | 71.9 |
| 7 | 67.9 |
| 8 | 64.9 |

During the selection of the initially mentioned type of capacitor, instead of 4, 6 single capacitors at 12 $\mu$F would then have to be provided for each part-bank. The number of capacitors in each capacitor bank thus increases by 50%.

Using the filter capacitor circuit according to the invention, the required size of the capacitor bank and the number of single capacitors can be minimised. Since the capacitor banks have the largest share in the total cost of a absorption circuit, this results in a more economic design overall.

We claim:

1. In absorption circuitry for filtering current harmonics of the type having a filter choke in series with a symmetric array of filter capacitor branches in parallel, each filter capacitor branch including a series combination of at least two capacitors, the improvement comprising:

compensating choke means connecting at least two nodes between symmetrically corresponding capacitors in the parallel filter capacitor branches, the inductance of the compensating choke means being at least approximately equal to $1/\omega^2 C$ wherein $\omega$ is the angular frequency of a harmonic to be filtered and C is the total capacitance of the array of parallel filter capacitor branches, whereby the virtual capacitance of the absorption circuitry substantially retains its rated value after failure of a capacitor in the array.

2. The absorption circuitry according to claim 1, wherein the improvement further includes at least one current detector connected in series with the compensating choke means.

3. The absorption circuitry according to claim 1 wherein, in the improvement, the capacitances of the capacitors in said filter capacitor branches are all of equal magnitude.

4. In absorption circuitry for filtering current harmonics in electrical lines of the type having a filter choke connected in series with a symmetric array of filter capacitor branches in parallel, each filter capacitor branch including a series combination of at least two capacitors, the improvement comprising:

compensating choke means connected to define the only direct connection between at least two nodes between at least two of the series capacitors in separate ones of the symmetric filter capacitor branches.

* * * * *